US006983767B2

(12) United States Patent

Rickards

(10) Patent No.: US 6,983,767 B2

(45) Date of Patent: Jan. 10, 2006

(54) SLEEVE FOR A HOSE

(75) Inventor: Lisa M. Rickards, Holmesville, OH (US)

(73) Assignee: Action Coupling and Equipment, Inc., Holmesville, OH (US)

( * ) Notice: Subject to any disclaimer, the term of this patent is extended or adjusted under 35 U.S.C. 154(b) by 0 days.

(21) Appl. No.: 10/723,022

(22) Filed: Nov. 26, 2003

(65) Prior Publication Data

US 2004/0103949 A1 Jun. 3, 2004

Related U.S. Application Data

(60) Provisional application No. 60/429,523, filed on Nov. 27, 2002.

(51) Int. Cl.
*F16L 11/00* (2006.01)

(52) U.S. Cl. ...................... 138/110; 138/104; 138/158; 138/161

(58) Field of Classification Search ................ 138/104, 138/158, 161, 107, 106, 110
See application file for complete search history.

(56) References Cited

U.S. PATENT DOCUMENTS

| | | | | | |
|---|---|---|---|---|---|
| 274,019 | A | | 3/1883 | Murphy | |
| 2,003,733 | A | * | 6/1935 | Bishop | 206/315.6 |
| 3,030,250 | A | | 4/1962 | Losse | |
| 3,431,947 | A | * | 3/1969 | Hines | 138/106 |
| 3,824,140 | A | | 7/1974 | Hofmann | |
| 4,231,595 | A | * | 11/1980 | Knutsen | 285/38 |
| 4,558,807 | A | * | 12/1985 | Jackson | 224/251 |
| 4,643,229 | A | * | 2/1987 | Hickin | 138/109 |
| 4,804,218 | A | * | 2/1989 | Hilliard | 294/31.2 |
| 4,844,000 | A | * | 7/1989 | Clement | 116/205 |
| 4,984,724 | A | * | 1/1991 | Johnston | 224/257 |
| 5,027,862 | A | * | 7/1991 | Laybourn | 138/99 |
| 5,039,133 | A | | 8/1991 | Albrecht | |
| 5,095,576 | A | * | 3/1992 | Galigan | 15/246.2 |
| 5,226,456 | A | * | 7/1993 | Semak | 138/107 |
| 5,285,744 | A | | 2/1994 | Grantham et al. | |
| 5,423,586 | A | * | 6/1995 | Fuller | 294/149 |
| 5,489,126 | A | * | 2/1996 | Gray, Jr. | 285/93 |
| 5,490,742 | A | * | 2/1996 | Cronk | 405/157 |
| 5,651,161 | A | * | 7/1997 | Asta | 15/325 |
| 5,687,773 | A | * | 11/1997 | Ryan et al. | 138/96 R |
| 5,901,756 | A | * | 5/1999 | Goodrich | 138/167 |
| 5,904,183 | A | * | 5/1999 | Leech | 138/110 |
| 5,921,657 | A | * | 7/1999 | Case | 362/191 |
| 5,933,914 | A | * | 8/1999 | Beane | 15/339 |
| 6,087,595 | A | | 7/2000 | Linhart | |
| 6,179,007 | B1 | * | 1/2001 | Cote | 138/106 |
| 6,227,249 | B1 | | 5/2001 | Akedo et al. | |
| 6,386,238 | B1 | * | 5/2002 | Hestetune | 138/110 |
| 2004/0200536 | A1 | * | 10/2004 | Strasser et al. | 138/104 |

OTHER PUBLICATIONS

Web Page: Chief Supply—Hose Tote Strap System; www.chiefsupply.com/hosetote.phtml; dated Oct. 25, 2002.

Web Page: Rawhide Fire Hose; www.rawhidefirehose.com/draft_specs.asp; date Oct. 25, 2002.

Web Page—ACW Industries; www. acculoc.com; dated Nov. 24, 2003.

* cited by examiner

*Primary Examiner*—James Hook
(74) *Attorney, Agent, or Firm*—Jones Day

(57) ABSTRACT

A covering for a suction hose includes a sleeve positioned around a suction hose and restraints positioned at the ends of the sleeve for removably coupling the sleeve to the suction hose. The suction hose has a length and the sleeve extends at least along a portion of the length of the suction hose. Handles, pockets, lashes or ties, and reflective materials may be positioned on the sleeve. Indicia may also be positioned on the sleeve. A method of advertising and a method of transporting a suction hose is also provided.

27 Claims, 3 Drawing Sheets

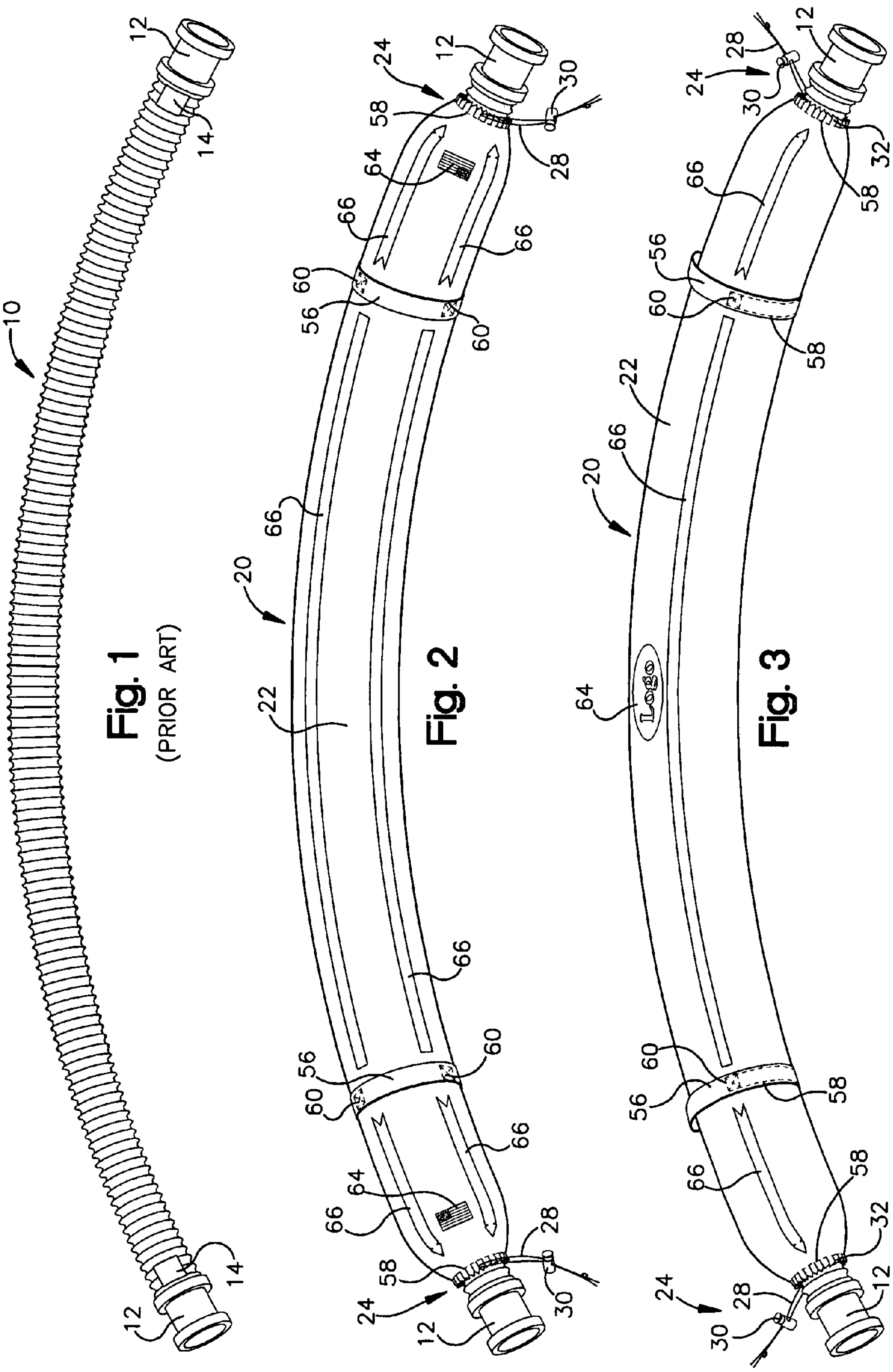
Fig. 1
(PRIOR ART)
Fig. 2
Fig. 3
10
12
14
20
22
24
28
30
32
56
58
60
64
66
Logo

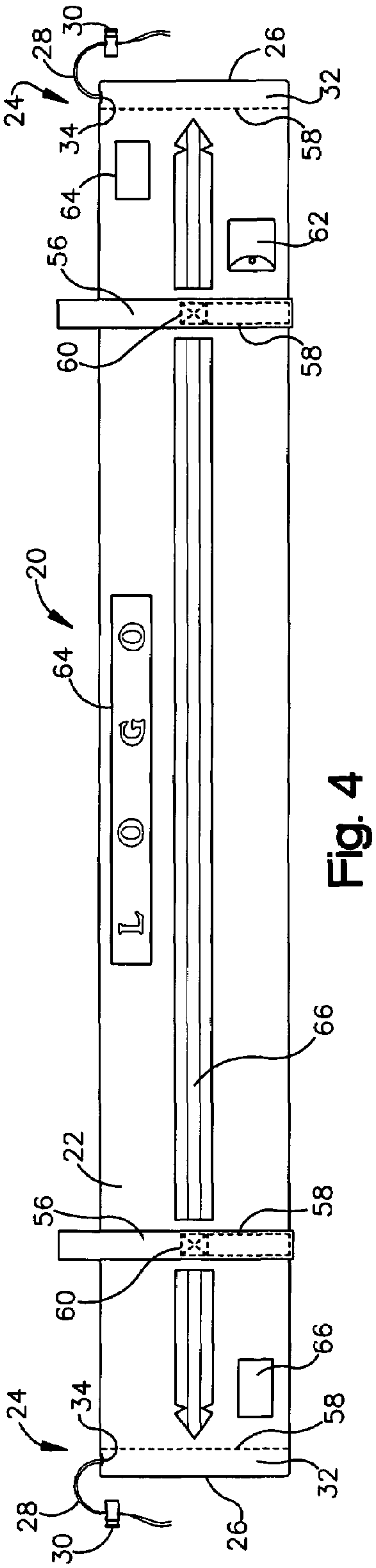
Fig. 4
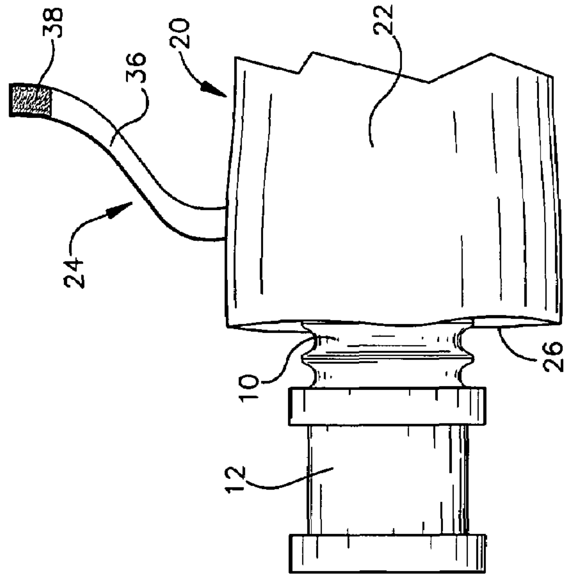
Fig. 6
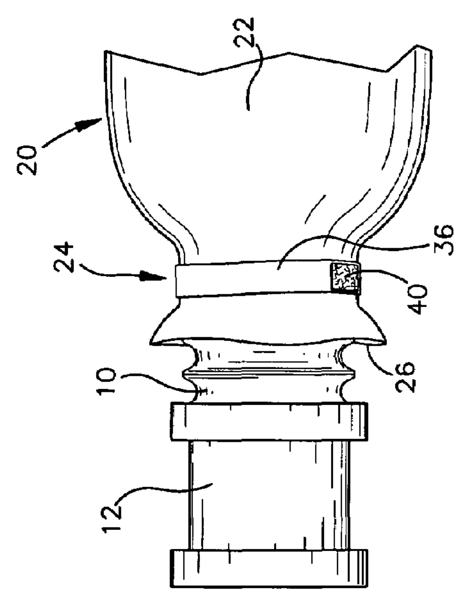
Fig. 5

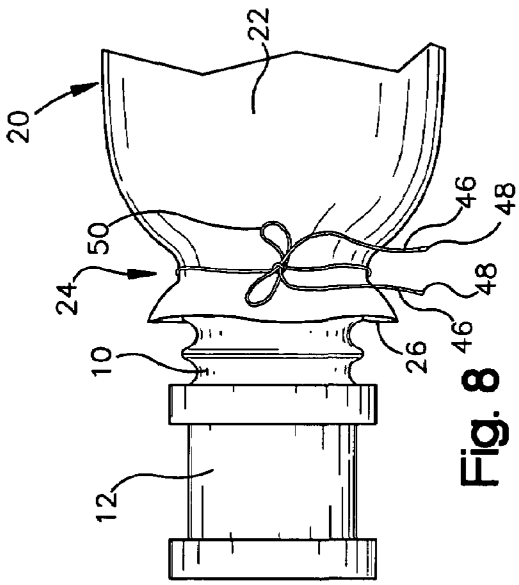
Fig. 8
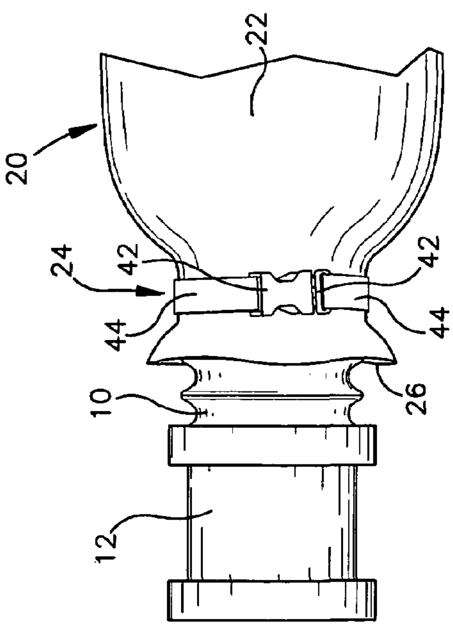
Fig. 7
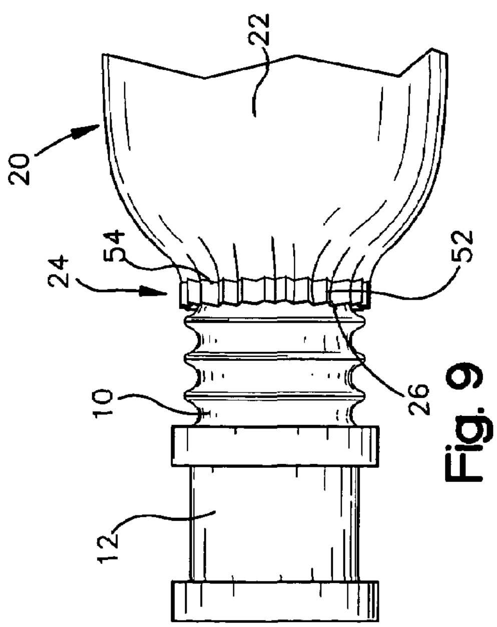
Fig. 9

SLEEVE FOR A HOSE

CROSS-REFERENCE TO RELATED APPLICATION

This application claims the benefit of U.S. Provisional Application No. 60/429,523, filed Nov. 27, 2002.

FIELD OF THE INVENTION

The claimed invention relates to a sleeve for a hose. In particular, the invention relates to a protective sleeve that is positionable around a suction hose.

BACKGROUND OF THE INVENTION

In fire fighting operations where fire hydrants are not accessible, it is necessary to suction or draft water from a water source, such as a pond. Suction hoses are utilized for this purpose and are often corrugated, flexible, and provided in multiple sections. Couplings are attached to either end of the suction hose sections and are utilized to couple multiple sections of the hose together. Suction hose sections are stored on a fire truck and are often positioned along the top, outer edges of the fire truck in hose beds, where they are typically visible from the exterior of the truck. As a result, suction hoses are exposed to the elements and may degrade more quickly than if they were stored in an enclosure. Ultraviolet degradation is common. Suction hoses also tend to get dirty during use. Thus, operators often choose to purchase suction hoses based upon their color, and not necessarily their quality.

In use, a suction hose is connected to a pump on the fire truck at one end and positioned in a water source at the other end. Water is pumped from a water source through the suction hose to eventually reach the fire fighting hoses. Many suction hoses have a transparent portion so that the operator can confirm that water is being suctioned continually through the hose. The transparent portion can be positioned between the corrugations of the suction hose, or defined as a window in the ends of the hose.

Suction hoses are also utilized for industrial operations. Such operations include suction and low pressure transfer of water and light chemical solutions. One type of industrial usage is in landfill gas recovery operations.

SUMMARY

According to one embodiment of the invention, a covering for a suction hose having a length is provided. The covering has a sleeve and at least one restraint positioned on the sleeve for removably coupling the sleeve to a suction hose. The at least one restraint includes at least one of an elastic cord and cord lock, an elastic cuff, a lash, a VELCRO™ strap, a belt having a buckle, a strap having a snap, and at least one tie. The at least one restraint is positioned at one end of the sleeve. In one embodiment, the at least one restraint comprises two restraints, each of which is positioned at an end of the sleeve. The restraints are configured to allow the sleeve to be movable along the length of a suction hose. The at least one restraint may be positioned in the vicinity of at least one end of the sleeve.

The sleeve is preferably made of a washable material. A type of material that may be used is nylon or nylon blends.

At least one handle is preferably positioned on the sleeve. In one embodiment, the at least one handle comprises two handles that are positioned on the sleeve, and the two handles are spaced from the ends of the sleeve. The handles may be sewn to the sleeve. The at least one handle may comprise a strap in the form of a loop positioned around the circumference of the sleeve, with the handle being secured to the sleeve along part of its width and being free of the sleeve along another part of its width.

In one embodiment, the sleeve has a width that is greater than a diameter of the suction hose. The sleeve may have a length that extends between a first and a second end of a suction hose. The sleeve may alternatively have a length that exceeds the length of a suction hose.

The sleeve may include a storage portion positioned on the sleeve. The storage portion may be at least one of a pocket that is sewn onto the sleeve and a plurality of lashes for lashing an instrument to the sleeve.

The sleeve may include indicia on an exterior surface thereof. The indicia may be at least one of a logo, a name, a telephone number, and advertising material. In one embodiment, the indicia is positioned on at least one patch that is connected to the sleeve. The indicia may alternatively be screen printed, sewn, or painted on the sleeve.

At least one reflective member may be positioned on the sleeve. The reflective member may comprise at least one reflective band positioned on the sleeve.

The sleeve may comprise a single sheet of material that is sewn along a single seam to form the sleeve for surrounding the suction hose.

The invention also concerns a method of advertising comprising positioning the covering having indicia around a suction hose. The method may also include positioning the suction hose on a vehicle such that the indicia is visible from an exterior of a vehicle.

In yet another embodiment, a method of transporting a suction hose comprises positioning the covering around a suction hose, grasping the at least one handle of the covering, and transporting the suction hose.

BRIEF DESCRIPTION OF THE DRAWING FIGURES

FIG. 1 is a perspective view of a typical corrugated suction hose that is used in fire fighting for drafting water;

FIG. 2 is a perspective top view of a sleeve according to one embodiment of the invention positioned around the suction hose of FIG. 1;

FIG. 3 is a perspective side view of the sleeve shown in FIG. 2 positioned around the suction hose;

FIG. 4 is a side view of the sleeve shown in FIG. 2, but in an uninstalled position;

FIG. 5 is an end perspective view of one type of end restraint for the sleeve;

FIG. 6 is an end perspective view of the end restraint of FIG. 5 in an uninstalled position;

FIG. 7 is an end perspective view of another type of end restraint;

FIG. 8 is an end perspective view of another type of end restraint; and

FIG. 9 is an end perspective view of yet another type of end restraint.

DETAILED DESCRIPTION OF THE INVENTION

A suction hose 10 is shown in FIG. 1 as including a corrugated section of hose 10 with couplings 12 positioned at either end of the section of hose 10. The couplings 12 are configured for adjoining like sections of hose 10 together.

Suction hoses 10 may be transparent or have transparent portions for allowing an operator to confirm proper operation during a pumping operation. Some known hoses include transparent portions between the corrugations of the hose 10. Others utilize windows 14 that are positioned at the respective ends of the hose 10. Suction hose sections come in various lengths and diameters. Standard diameters for suction hoses 10 include 1.5", 2", 2.5", 3", 4", 5", 6", and 8". A more popular diameter is 6 inches. Standard lengths for suction hose sections include 10 or 12 feet sections with couplings 12 of 6 inches in length each, so that the total length of the suction hose 10 with couplings 12 is approximately 11 or 13 feet.

Suction hoses 10 are typically flexible, with the flexibility being provided in part by the corrugations and in part by the type of material utilized to make the hose 10. Suction hoses 10 are also made of a generally hard material so that they are more durable under the rough conditions that may be associated with drafting water or chemicals from a pool or pond. A typical suction hose 10 is made of PVC.

Suctions hoses 10 are often positioned on a fire truck or similar vehicle and exposed to the elements. On fire trucks, they are often positioned along the top, outer surface of the truck in hose beds. Suction hoses 10 are often visible from the exterior of the truck and are continually exposed to the elements, such as ultra violet rays, heat, and smoke and dirt associated with a fire. As a result, they tend to deteriorate more quickly than if they were in an unexposed environment. They also tend to become dirty and may suffer from unwanted wear due to rubbing of the hose 10 against the hose bed. The color of suction hoses is often a basis for selecting a particular suction hose 10, rather than quality or other factors.

FIGS. 2–4 depict a suction hose covering 20 according to the invention. The suction hose covering 20 comprises a sleeve 22 that extends along the length of the suction hose 10 and is used to protect the hose 10 from the detrimental factors discussed above. In addition, the covering 20 may be used in assisting in transporting the suction hose 10, and in advertising, as will be discussed in greater detail below.

The covering 20 comprises a sleeve 22 that is tube shaped so that it surrounds the suction hose 10. In a preferred embodiment, the sleeve 22 has a length that is at least equal to the length of the suction hose 10. The sleeve may alternatively be longer or shorter than the suction hose 10. The sleeve 22 also preferably has a width that is greater than the suction hose 10. For example, for a suction hose 10 having a length of 10 feet and a diameter of 8 inches, one embodiment of the sleeve 22 has a length of approximately 10 feet and a width of about 13 inches. For a six inch diameter, 11 foot long hose, a sleeve having a length of approximately 11 feet and a width of 10 inches is desirable. For a 4 inch diameter, 11 foot long hose, a sleeve having a length of 11 feet and a width of 7 inches is desirable. It is desirable to have a sleeve 22 that is at least the same length as or slightly longer than the hose 10 in order to allow for stretching, flexing, and bending of the underlying hose 10 without pulling on the sleeve 22.

The material of the sleeve 22 is preferably rugged, strong, and washable. A preferred material is nylon. The material may be treated with a fabric protectant, such as SCOTCHGARD™. The fabric protectant can be reapplied to the material after washing. It is preferred that the material is washable in a standard or industrial strength washing machine, such as those readily available at fire stations.

The material of the sleeve 22, while rugged and durable, is also flexible to allow ease in sliding the sleeve 22 onto the suction hose 10, and to allow for adjustment of the position of the sleeve 22 during usage. During storage of the suction hose 10 in a hose bed, the sleeve 22 is preferably positioned so that it covers the entire extent of the hose 10. During usage of the hose 10 for drafting purposes, the sleeve 22 may be slid back from the couplings 12 so that part of the suction hose 10 is visible. Suction hoses 10 typically will include a transparent portion, as discussed above, through which the operator can confirm proper operation of the suction hose 10. Since the sleeve 22 is flexible, it may be slid back on the suction hose 10 so that any window 14 or transparent sections of the hose 10 are visible.

As shown in FIGS. 2–9, the sleeve 22 utilizes restraints 24 that are positioned on the sleeve for restraining the position of the sleeve relative to the suction hose 10. In a preferred embodiment, the restraints 24 are positioned at the ends 26 of the sleeve 22. The restraints 24 are preferably fastenable and unfastenable for restraining the ends 26 of the sleeve 22 at any desired position along the length of the sleeve 22. The restraints 24 may also be used to restrain the sleeve 22 on the couplings 12 at the end of the suction hose 10, if desired.

FIGS. 2–4 show a first type of restraint 24 where an elastic cord 28 is utilized along with a cord lock 30. The elastic cord is positioned in a pocket 32 that is sewn into the ends 26 of the sleeve 22. A reinforced opening 34 is provided in the pocket 32 out of which the two ends of the elastic cord 28 extend. The ends of the elastic cord 28 are inserted in the cord lock 30 and are tied together. In a preferred embodiment, the ends of the cord 28 are reinforced to avoid fraying. In operation, when the sleeve 22 is installed around the hose 10, the elastic cord 28 is pulled tight at both ends while the cord lock 30 is slid toward the sleeve 22. The pocket 32 sewn into the sleeve 22 then bunches together as the elastic cord 28 tightens around the hose 10, as shown in FIGS. 2 and 3.

FIG. 4 shows the cord 28 in an untightened position, prior to assembly of the sleeve 22 on a hose 10. In one embodiment, the elastic cord 28 is made of nylon and is ⅛" in diameter, and the cord lock is a standard ¼ inch cord lock made of acetal, both of which are available from American Cord & Webbing Co., Inc. of Woonsocket, R.I. Other types of cording and cord locks may alternatively be utilized. For instance, the cording may be made of cotton, polyester, or polypropylene, among other materials.

Another type of end restraint, in the form of a VELCRO™ strap 36, is shown in FIGS. 5 and 6. One end of the VELCRO™ strap 36 is connected to the sleeve 22, such as by sewing, tacking, or other attachment mechanism. The VELCRO™ strap 36 has hooks 38 positioned at the free end of the strap and loops 40 positioned on at least part of the length of the other side of the strap 36 so that the strap 36 can be wrapped around the sleeve 22 and hose 10, and the hooks 38 can engage the loops 40 on the strap 36 to tighten the sleeve 22 around the hose 10. FIG. 5 shows the strap 36 tightened on the end of the hose 10. In order to move the location of the sleeve 22 relative to the couplings 12 on the hose 10, the VELCRO™ strap 36 is loosened and then retightened at the desired position. The strap may be made of an elastic or non-elastic material. Nylon webbing is a preferred material. The hooks 38 may alternatively be positioned on part of the length of the strap 36 while the loops 40 are positioned on the free end of the strap 36.

FIG. 7 shows an another alternative restraint 24 in the form of snap buckles 42 that are attached to straps 44. Two straps 44 are utilized and are connected to the sleeve 22, such as by sewing, tacking, or other attachment mechanism. Mating snap buckles 42 are positioned at the free ends of the straps 44 and are buckled together to tighten the sleeve 22 around the hose 10. In this embodiment, the straps 44 are non-elastic and preferably have a length so that they will tightly engage the hose 10 when the buckles 42 are snapped together. Alternatively, the straps 44 may be made of an elastic material that together are preferably slightly shorter than the circumference of the hose 10. The elastic straps are stretched in order to allow the two parts of the buckle 42 to snap together. In order to move the location of the sleeve 22 relative to the couplings 12 on the hose 10, the buckles 42 are disengaged and then reengaged at the desired position.

FIG. 8 shows yet another embodiment of the end restraint 24 in the form of a tie 46. The tie 46 is secured to the sleeve 22 by any known means of attachment so that the ends 48 of the tie are free. In order to secure the sleeve 22 to the hose 10, the ends 48 of the tie 46 are wrapped around the sleeve 22 and hose 10 and pulled tight and knotted together in a bow 50 or other type of knot. The sleeve location is movable by untying the knot 50, moving the sleeve location, and retying the knot 50.

FIG. 9 shows another alternative restraint 24 in the form of an elastic cuff 52. In this embodiment, a cuff 52 is formed at the ends 26 of the sleeve 22 and is elasticized so that it grips the underlying hose 10. The cuff 52 at the end 26 of the sleeve may be elasticized by any conventionally known means for elasticizing. For example, a pocket 54 can be sewn in the ends of the sleeve and an elastic ribbon (not shown) may be threaded into the pocket 54 and sewn in a loop. The elastic cuff 52 is preferably sized so that it grips the hose 10, but allows the sleeve 22 to be slid along the hose 10 should the operator desire to move the sleeve 22. Other types of restraints 24 may also be utilized, such as lashes, hooks, buckles, clasps, double D-rings, and the like, the invention not being limited to a particular type of restraint. One manufacturer of such clasps is American Cord & Webbing Co., Inc. of Woonsocket, R.I.

Suction hoses 10 can weigh 50 lbs. or more per section. Thus, one embodiment of the invention adds handles 56 to the sleeve 22. As shown in FIGS. 2–4, handles 56 may be positioned at various positions along the length of the sleeve 22. The handles 56 can be formed of the same material, or of a different material than the material of the sleeve 22. For instance, nylon webbing may be utilized as handles 56, with the ends of the webbing being sewn to the sleeve 22 at the desired location along the length of the sleeve 22. Alternatively, rubber-like handles (not shown) may be utilized with straps or ropes that are coupled to the handles and to the sleeve 22. Other types of handles may also be utilized. For instance, the webbing may be made of polypropylene or cotton, among other materials.

The handles 56 are sturdy enough to allow for transporting the suction hose 10, and are also preferably substantial enough so that they do not hurt the transporter's hand during transport. In one embodiment, shown in FIGS. 2–4, handles 56 are positioned in proximity to the ends 26 of the sleeve 22, such that two handles 56 are provided. In a preferred embodiment where the sleeve is about 10 feet long, the handles 56 are positioned at about 2 feet from each end 26 of the sleeve 22. In another embodiment, which is not shown, the handles 56 are positioned at spaced distances along the length of the sleeve 22. For instance, for an 11 foot long sleeve, handles 56 are positioned at about 3.5 feet from the ends and also in the center of the sleeve, for a total of three handles 56. Handles 56 may be positioned in any number at any desired position along the length of the sleeve 22.

As shown in FIGS. 2–4, the handles 56 are formed from a flat webbing strap that extends around the circumference of the sleeve 22. The ends of the webbing may be sewn into a seam that runs along the length of the sleeve. This seam is preferably positioned at the bottom of the sleeve. Alternatively, the ends of the webbing may be sewn together to form a loop. The webbing is preferably fastened to the lower part of the circumference of the sleeve using stitching 58, while the upper part of the webbing is free and is utilized for carrying the sleeve. A reinforced area of stitching 60 is preferably positioned at the end of the stitched area to promote durability of the sleeve 22. The webbing preferably has a length that is greater than the circumference of the sleeve 22 in order to promote ease in grasping the handle 56. In one embodiment, the webbing has a length that is about an inch greater than the circumference of the sleeve 22. One type of webbing that may be utilized is made of nylon, has a width of two inches, and is available from American Cord & Webbing Co., Inc. of Woonsocket, R.I. Other widths of webbing may alternatively be utilized. The stitching used for sewing on the handles or defining the pockets, described above, in a preferred embodiment, is made of heavy duty polyester blend thread, although other types of thread may be used.

The invention also concerns a method for transporting a suction hose 10. The method includes positioning a sleeve 22 having handles 56 around the suction hose 10, grasping at least one of the handles 56, and transporting the hose 10.

The sleeve may also utilize a pocket 62 positioned on the sleeve 22 for storing tools or other materials on the sleeve 22. A pocket 62 is shown sewn onto the sleeve 22 in FIG. 4. Alternatively, VELCRO™ straps or other ties or lashes (not shown) may be utilized for holding tools or other materials on the sleeve 22 in a conventional manner.

The sleeve 22, handles 56, and straps 44 utilized with the current invention are preferably made of a nylon or nylon blend material. A nylon canvas or tarp material may be utilized. Other types of blends or materials may also be utilized, the invention not being limited to a particular type of material. The sleeve 22 may be manufactured of a different material from the handles 56 and straps 44, or the sleeve 22, handles 56 and straps 44 may be manufactured of the same material. The material selected is preferably durable enough to withstand the elements to which suction hoses are typically subjected and preferably strong enough to allow an operator to transport the suction hose 10 by either grasping the cover or by grasping the handles 56.

The material of the sleeve 22 may be formed from a sheet of material that is sewn to form a tubular shaped sleeve 22. Alternatively, the sleeve 22 may be manufactured as a one-piece woven material. Other constructions for the sleeve 22 may also be utilized, the invention not being limited to a particular construction.

In yet another embodiment of the invention, the sleeve 22 may be utilized for advertising purposes. Since suction hoses 10 are typically positioned along the outer, upper sides of a fire truck, they are usually visible to the public. The sleeve 22 can be utilized for sporting advertising material, logos, names, phone numbers, or any other type of indicia that is desirable. This indicia may be screen printed onto the sleeve 22, sewn on, painted on, or otherwise associated with the sleeve 22. An example of a company logo is shown in FIGS. 3 and 4 as being attached on the side of the sleeve 22 with a patch 64. Thus, the current invention also concerns a method of advertising, which includes positioning a sleeve 22 having indicia around a suction hose 10 and positioning the suction hose 10 on a vehicle so that the indicia is visible from the exterior of the vehicle. The method may also be utilized without positioning the hose 10 on a vehicle.

In yet another embodiment, the invention includes positioning reflective material 66 at various locations along the length of the sleeve 22. Reflective material 66 will make the sleeve 22 and hose 10 more visible. The reflective material 66 may be in the form of bands, patches, or otherwise. In one embodiment, shown in FIGS. 2–4, reflective bands are positioned along the length of the sleeve 22. FIGS. 2 and 3 show reflective bands of a single color while FIG. 4 shows reflective bands having more than one color of reflective material. In another embodiment, which is not shown, patches or reflective material are dispatched circling the sleeve, or as patches at various positions along the length of the sleeve 22. Other positions for the reflective material 66 may also be utilized, if desired.

While the above description has been in the context of fire fighting applications, the invention is not limited to usages in fire fighting situations. The invention is applicable in other applications where suction hoses are utilized, such as industrial and other applications.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A covering of a suction hose having a length comprising:

a sleeve positioned around a suction hose and extending at least along a portion of a length of a suction hose, said sleeve having a circumference;

at least one restraint positioned on the sleeve for removably coupling the sleeve to a suction hose; and means for carrying the sleeve, said means comprising at least one strap sewn to the sleeve in the form of a loop having an opening configured for grasping by the hand of a user, said loop extending at least partially around the circumference of the sleeve for supporting the weight of a suction hose during transport.

2. The covering of claim 1, wherein the at least one restraint includes at least one of an elastic cord and cord lock, an elastic cuff, a lash, a hook and loop tape strap, a belt having a buckle, a strap having a snap, and at least one tie.

3. The covering of claim 1, wherein the at least one restraint comprises two restraints, each of which is positioned at an end of the sleeve.

4. The covering of claim 1, wherein the restraints are configured to allow the sleeve to be movable along the length of a suction hose.

5. The covering of claim 1, wherein the sleeve is made of a washable material.

6. The covering of claim 1, wherein the sleeve is made of nylon or nylon blends.

7. The covering of claim 1, wherein the sleeve has a width that is greater than a diameter of the suction hose.

8. The covering of claim 1, further comprising a storage portion positioned on the sleeve.

9. The covering of claim 8, wherein the storage portion is at least one of a pocket that is sewn onto the sleeve and a plurality of lashes for lashing an instrument to the sleeve.

10. The covering of claim 1, wherein the sleeve has a length that extends between a first and a second end of a suction hose.

11. The covering of claim 1, wherein the sleeve has a length that exceeds the length of a suction hose.

12. The covering of claim 1, wherein the sleeve includes indicia on an exterior surface thereof.

13. The covering of claim 12, wherein the indicia is at least one of a logo, a name, a telephone number, and advertising material.

14. The covering of claim 12, wherein the indicia is positioned on at least one patch that is connected to the sleeve.

15. The covering of claim 12, wherein the indicia is screen printed, sewn, or painted on the sleeve.

16. A method of advertising comprising:

positioning the covering of claim 12 around a suction hose.

17. The method of claim 16, further comprising positioning the suction hose on a vehicle such that the indicia is visible from an exterior of a vehicle.

18. The covering of claim 1, further comprising at least one reflective member positioned on the sleeve.

19. The covering of claim 18, wherein the reflective member comprises at least one reflective band positioned on the sleeve.

20. The covering of claim 1, wherein the sleeve comprises a single sheet of material that is sewn along a single seam to form the sleeve for surrounding the suction hose.

21. The covering of claim 1, wherein the at least one restraint is positioned in the vicinity of at least one end of the sleeve.

22. A covering of a suction hose having a length comprising:

a tube-like sleeve positioned around a suction hose and extending at least along a portion of a length of a suction hose, said sleeve having a circumference;

at least one restraint positioned on the sleeve for removably coupling the sleeve to a suction hose; and a plurality of straps fixedly attached to the sleeve in the form of a loop having an opening configured for grasping by the hand of a user, each said loop extending at least partially around the circumference of the sleeve for together supporting the weight of a suction hose during transport, wherein the sleeve is made of a material that reduces exposure of the suction hose exterior to heat and other contaminants and thereby reduces exterior degradation of the suction hose.

23. A covering for transporting a suction hose having a length comprising:

a tube-like sleeve positioned around a suction hose and extending along the length of a suction hose;

two restraints positioned at opposite ends of the sleeve for removably coupling the sleeve to a suction hose; and at least two handles coupled to the sleeve, each said handle being configured as a strap that is coupled to the sleeve at spaced locations along the length of the sleeve, said straps being in the form of a loop where a portion of the loop is free from the sleeve to provide a gap between the strap and the sleeve allowing a user's hand to enter the gap and grip the handle in order to transport the sleeve using the handles, wherein each handle at least partially surrounds the sleeve, and wherein each strap includes a coupled portion where the strap is coupled to the sleeve.

24. The covering of claim 23, wherein three straps are provided, two of the three straps are positioned in the vicinity of the ends of the sleeve, and a third strap is positioned near the center of the sleeve.

25. The covering of claim 24, further comprising at least one selectively closeable storage portion formed independent of the sleeve and coupled to the sleeve.

26. The covering of claim 25, wherein the selectively closeable storage portion is a pocket formed separate from the sleeve and sewn to the sleeve along its perimeter and a plurality of lashes for lashing an instrument to the sleeve.

27. The covering of claim 23, wherein the coupled portion includes a plurality of stitches that are sewn through the strap and the sleeve to fixedly join the strap to the sleeve.

* * * * *